Patented June 11, 1929.

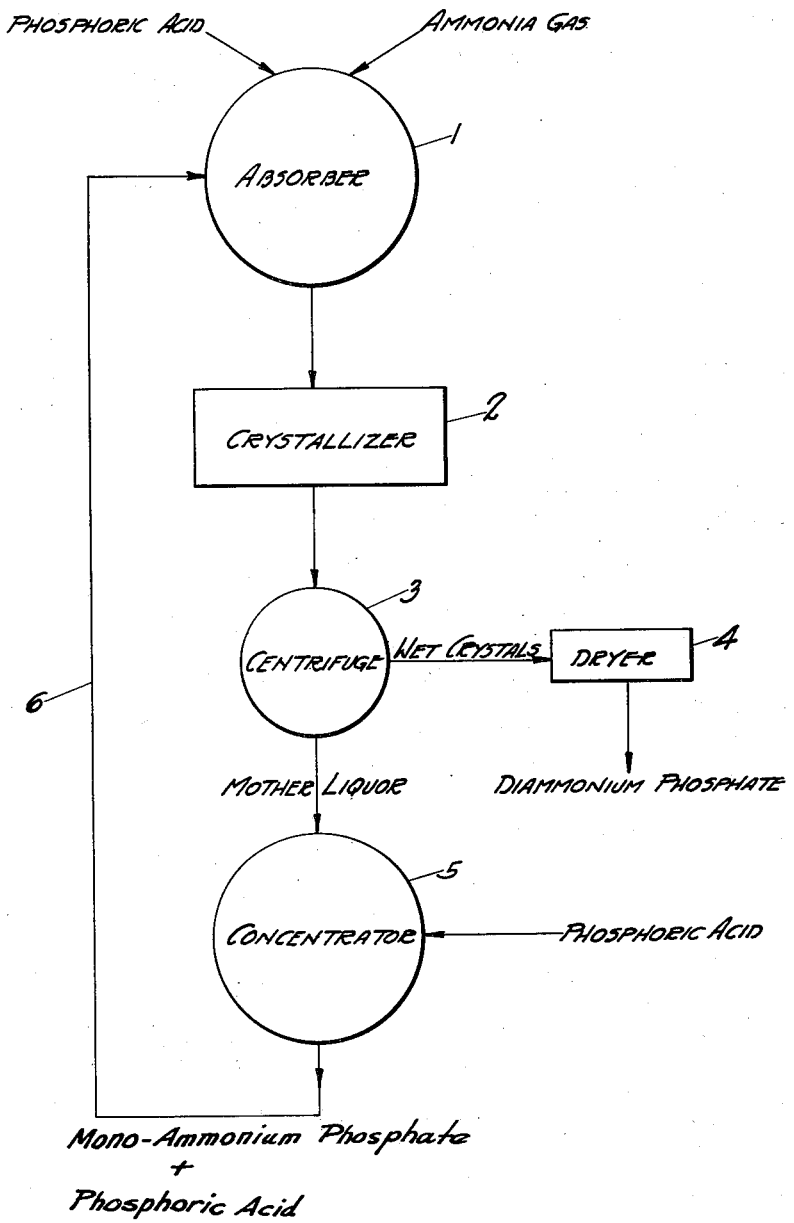

1,716,415

UNITED STATES PATENT OFFICE.

GUY H. BUCHANAN, OF WESTFIELD, NEW JERSEY, ASSIGNOR TO AMERICAN CYANAMID COMPANY, OF NEW YORK, N. Y., A CORPORATION OF MAINE.

METHOD OF MAKING DIAMMONIUM PHOSPHATE.

Application filed June 17, 1924. Serial No. 720,566.

This invention relates to phosphates, more particularly to a method of making di-ammonium phosphate.

As is well known there are three phosphates of ammonia, the mono-, di- and tri-, containing one, two and three molecules of ammonia respectively. The first of these is the most stable and does not decompose with liberation of ammonia under ordinary conditions. The di- and tri-salts are more unstable; the second may be formed at temperatures between 60° and 90° C. while the third is unstable at any temperatures above atmospheric. In fertilizers it is desirable that the material have a high nitrogen content and this may be obtained in the case of ammonium phosphates by providing those compounds having more than one molecule of ammonia. Therefore, this invention relates to the production of such compounds, being particularly directed to the formation of the di-salt, which, I have found, may be made in stable form without the loss of nitrogen.

In the manufacture of di-ammonium phosphate from phosphoric acid and ammonia it has been customary to ammoniate a phosphoric acid solution of such a strength that the resulting solution required concentration by evaporation before the di-ammonium phosphate could be recovered. Due to the fact that di-ammonium phosphate hydrolyzes to form mono-ammonium phosphate and ammonia, the concentration of its aqueous solutions is difficult to carry out without contamination of the product and loss of ammonia. Vacuum evaporation has been proposed. This, however, is an expensive and troublesome operation which requires special equipment, and which even at best does not prevent considerable hydrolysis and decomposition of the di-ammonium phosphate with the loss of ammonia. It has also been proposed to conduct the evaporation under sufficient ammonium pressure to prevent hydrolysis of the di-ammonium phosphate. This method has never given satisfactory results, because it also involves expensive and troublesome operations which require special equipment.

My invention is intended to obviate the disadvantages of the prior methods, it being among the objects thereof to devise a method of making di-ammonium phosphate which shall be more efficient than those heretofore used, which shall be simple, and shall require neither expert operators nor delicate or complicated controls.

My invention is based primarily upon the well known fact that between 60° and 90° C. phosphoric acid may be ammoniated to produce a solution of di-ammonium phosphate. I have discovered that if I use a concentrated solution of phosphoric acid say one containing 50% phosphoric anhydride, or a solution of mono-ammonium phosphate and ammoniate the same at a temperature between 60° and 90° C. substantially no mono-ammonium phosphate is precipitated and the entire solution is quantitively changed to di-ammonium phosphate with the precipitation of some di-ammonium phosphate. Upon cooling this solution, crystals comprising a major portion of the phosphoric acid in the solution precipitate out as di-ammonium phosphate. The reaction is such that during the ammoniation the mono-salt is first formed, this then being converted into the di-salt. As a result of this action, I may, if desired, start with the mono-salt and ammoniate the same as will be further explained below.

I have also found that solubility relations of mono- and di-ammonium phosphate are such that if I ammoniate, say, a saturated solution of mono-ammonium phosphate so as to produce the di-salt, a major portion of the latter may be precipitated by cooling, and the same may be recovered by simple filtration. I have also found that if I ammoniate a solution of mono-ammonium phosphate containing as little as 28% phosphoric anhydride, or the equivalent phosphoric acid solution, that is, one containing 30% phosphoric anhydride so as to produce di-ammonium phosphate, a major portion of the latter may be precipitated by cooling, and the same may be recovered by simple filtration.

The mother liquor produced by this filtration consists of a substantially saturated solution of di-ammonium phosphate. As previously pointed out such a solution cannot be concentrated without loss of part of its valuable ammonia content. I have found, however, that if such a solution is treated with sufficient phosphoric acid, a stable solution may be prepared. This stable solution may be concentrated, and may be returned to the process for the production of further quantities of di-ammonium phosphate.

In practicing my invention I may proceed as follows: I cause ammonia gas to react upon strong phosphoric acid to produce di-ammonium phosphate. I prefer to use a phoshoric acid solution containing from 30% to 50% phosphoric anhydride, for by using phosphoric acid of a strength between those limits I have discovered, as previously pointed out, that I can recover a major portion of the phosphoric acid in the form of solid di-ammonium phosphate merely by carrying out the ammoniation in the manner well known and then cooling the solution. That is, I cause ammonia gas to be absorbed by a phosphoric acid solution of the strength above given; and I may use for this purpose an absorber so designed that I may cool the solution below say 90° C. in the last stages of the absorption. In practice I prefer to secure a solution which is saturated with ammonia gas at a temperature higher than 70° C. and lower than 90° C. for I have found that between these limits a high grade di-ammonium phosphate can be produced.

I now cool this solution, preferably to atmospheric temperature or lower, and recover by a simple filtration the crystals which separate out. In drying the crystals of di-ammonium phosphate thus obtained I prefer to subject them to temperatures not higher than 50° C. in order to avoid any material decomposition thereof.

I next treat the mother liquor from said filtration with at least sufficient phosphoric acid to produce a solution in which the molecular ratio of ammonia to phosphoric acid will be unity, that is so that all the ammonia is converted from di-ammonium phosphate to mono-ammonium phosphate, and I may use sufficient phosphoric acid to produce an acid solution of mono-ammonium phosphate. In either case I secure a solution which is stable and which may be concentrated without loss of its valuable ammonia content. I now concentrate this solution until it contains from 28% to 43% phosphoric anhydride, $P_2O_5$. I may next add phosphoric acid of sufficient strength to give the desired concentration and use the mixture for the absorption of more ammonia.

In practice I have recovered in the crystals produced as high as 65% to 70% of the original phosphoric anhydride, $P_2O_5$, of the acid used. I have also obtained similar recoveries when using the reworked mother liquors of the process. It is, of course, obvious that the above figures do not refer to overall efficiencies. Since my process reworks all mother liquors it is evident that overall efficiencies approaching theoretical may be obtained.

The crystals which may be produced by my process are of high purity. Thus I have consistently obtained a dry crystalline product containing over 95% di-ammonium phosphate, the remainder consisting largely of mono-ammonium phosphate.

The accompanying drawing is a diagram or flow sheet illustrating the principles upon which my invention is based.

I provide an absorber 1 into which I place a solution of pure phosphoric acid containing about 40% phosphorus pentoxide. Ammonia gas is bubbled into the cold solution which absorbs the same producing salts of phosphoric acid with the evolution of heat. The temperature is allowed to rise to the boiling point, which may reach 110° C., after which the rate of admission of ammonia may be regulated or the absorber cooled artifically so as to cause the temperature to drop to 80° C., at the end of the ammoniation, which is indicated by the saturation of the solution with the ammonia. The hot liquid is then allowed to flow into the crystallizer 2 where it is allowed to cool to room temperature, producing solid di-ammonium phosphate which contains 60 to 70% of the phosphoric acid originally used. The whole mass is then treated in the centrifuge 3 and the crystals obtained therefrom are dried at a temperature which preferably does not exceed 50° C. in the dryer 4 to give the final product. The mother liquor is run into the concentrator 5 where sufficient phosphoric acid is added to convert all the di-ammonium phosphate in solution to the mono-ammonium phosphate. The mono-ammonium phosphate solution thus formed is then concentrated until the phosphorus pentoxide content thereof is about 43%, after which it is run into the absorber 1 through pipe 6. The cycle of operations is then repeated.

My invention has numerous advantages over the processes of the prior art in that there is but a single essential step involved and there is no complicated apparatus used therein. It is merely essential to saturate a strong solution of phosphoric acid or mono-ammonium phosphate with ammonia at a final temperature of about 80° C., and allow the same to cool. There is no expensive evaporation in a vacuum or at low temperatures. No ammonia is lost and I am enabled to produce substantially pure di-ammonium phosphate.

Although I have described my invention setting forth specific details thereof, my invention is not limited thereto. For instance, I may use a weaker phosphoric acid than that specified in the foregoing. Thus in order to use a weaker acid, say one containing 20% phosphoric anhydride, $P_2O_5$, I may pass ammonia into the same until sufficient has been absorbed to produce a solution of mono-ammonium phosphate. This solution may then be concentrated until it contains say 28% to 43% phosphoric anhydride, $P_2O_5$, when I obtain a solution from which di-ammonium phosphate may be precipitated as described above.

A weaker acid may also be used for neutralizing the di-ammonium phosphate liquor. Preferably in treating the mother liquors with a weak acid I add an excess of acid, neutralize the same with ammonia to the mono-stage and then concentrate. The excess to be added would be governed by the total quantity of mono-ammonium phosphate liquor which was to be ammoniated to produce di-ammonium phosphate.

It is obvious that if there is available a stronger phosphoric acid than those specified herein, it may be used to advantage in my process, particularly in neutralizing the di-ammonium phosphate mother liquors and so produce a fortified liquor which would require little or no concentration, depending on the strength of the acid used.

Instead of using a pure phosphoric acid, I may utilize an impure material containing a small percentage of gelatinous substances. I may add such acid to the di-ammonium phosphate in the concentrator to form mono-ammonium phosphate and allow the impurities to settle, after which the solution of the mono-salt is decanted and used in the process, or I may similarly ammoniate impure phosphoric acid to the mono-stage, remove the gelatinous impurities by settling and decantation, concentrate the same if so desired, and then ammoniate further as described above.

What I claim is:

1. A method of making di-ammonium phosphate which comprises providing a solution of acid phosphatic material, causing the same to react with ammonia at the boiling point, reducing the temperature to below 90° C. before the end of the reaction to produce di-ammonium phosphate, and cooling to precipitate the same.

2. A method of making di-ammonium phosphate which comprises causing acid phosphatic material to react with ammonia to form di-ammonium phosphate, cooling to precipitate the same, filtering, treating the mother liquor with sufficient phosphoric acid to form mono-ammonium phosphate, concentrating the same and ammoniating as before.

3. A method of making di-ammonium phosphate which comprises causing acid phosphatic material to react with ammonia to form di-ammonium phosphate, cooling to precipitate the same, filtering, treating the mother liquor with at least sufficient phosphoric acid to form mono-ammonium phosphate, concentrating the same and ammoniating as before.

4. In a method of making di-ammonium phosphate the steps which comprise providing a saturated solution of di-ammonium phosphate, adding phosphoric acid thereto, concentrating the solution and ammoniating the same to form di-ammonium phosphate.

5. In a method of making di-ammonium phosphate the steps which comprise providing a saturated solution of di-ammonium phosphate, adding phosphoric acid thereto to form mono-ammonium phosphate, concentrating the solution and ammoniating the same to form di-ammonium phosphate.

In testimony whereof, I have hereunto subscribed my name this 12th day of June, 1924.

GUY H. BUCHANAN.